United States Patent [19]
Garrett

[11] Patent Number: 5,375,294
[45] Date of Patent: Dec. 27, 1994

[54] RETRACTABLE CASTER ASSEMBLY

[75] Inventor: E. Alan Garrett, Calgary, Canada

[73] Assignee: Underkart Industries of Canada Ltd., Calgary, Canada

[21] Appl. No.: 123,397

[22] Filed: Sep. 17, 1993

[51] Int. Cl.⁵ .............................................. B60B 33/06
[52] U.S. Cl. .......................................................... 16/34
[58] Field of Search ............................ 16/34, 19, 32; 217/60 E

[56] References Cited

U.S. PATENT DOCUMENTS

| | | | |
|---|---|---|---|
| 234,496 | 11/1880 | Simmons | 16/34 |
| 3,563,592 | 2/1971 | Preston | 292/263 |
| 4,845,804 | 7/1989 | Garrett | 16/34 |

Primary Examiner—Kurt C. Rowan
Assistant Examiner—Chuck Y. Mah
Attorney, Agent, or Firm—Kane, Dalsimer, Sullivan, Kurucz, Levy, Eisele and Richard

[57] ABSTRACT

A retractable caster assembly incorporating a strut lock formed of a sleeve mounted on the strut for sliding movement thereon, between closed position removed from the pivot axis and not interfering with the folding of the strut, and operative position seated over the pivot axis to hold the strut members in aligned, operative position and prevent their pivoting with respect to each other. Sleeve control means are mechanically associated with the sleeve automatically to move the sleeve to closed position when the wheel is being retracted and to operative position when the wheel is moved to operative position.

17 Claims, 3 Drawing Sheets

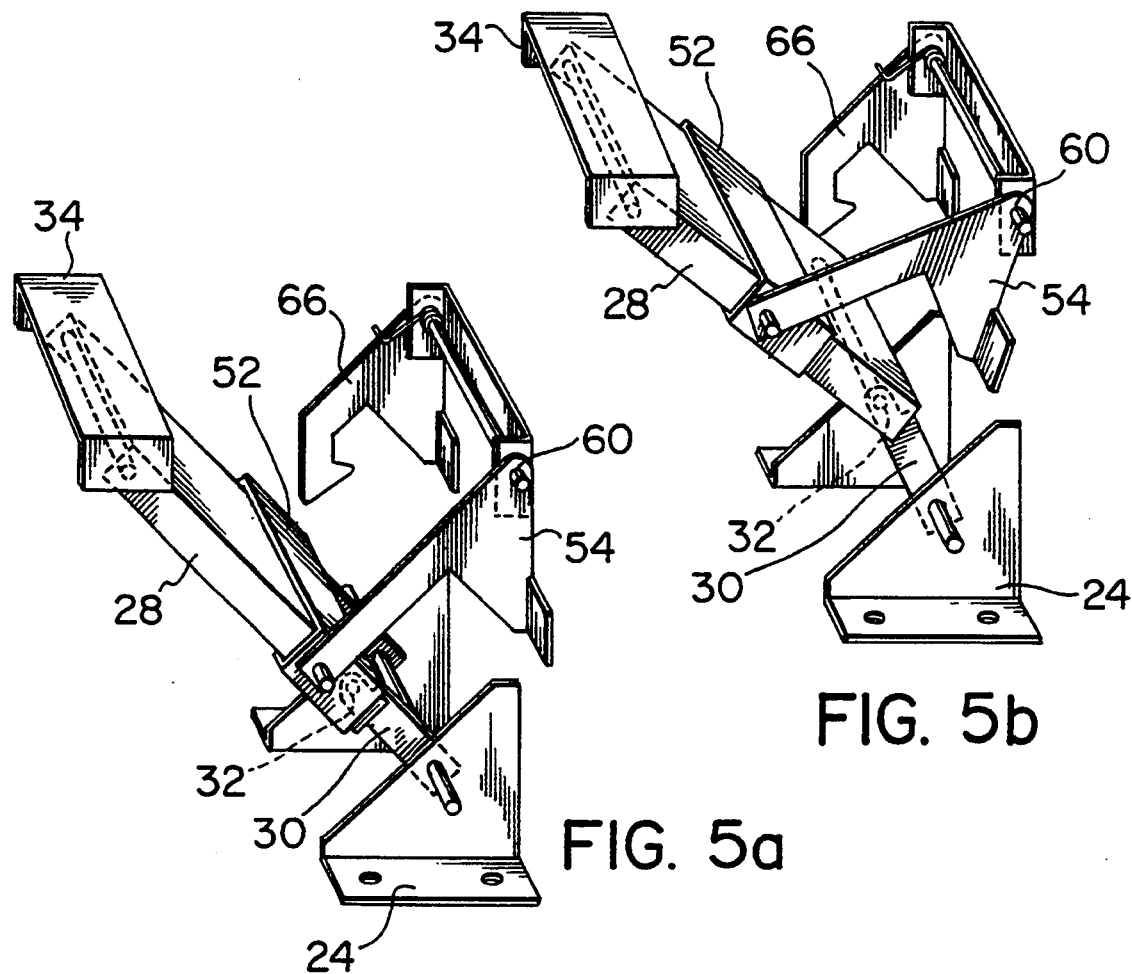
FIG. 5a
FIG. 5b
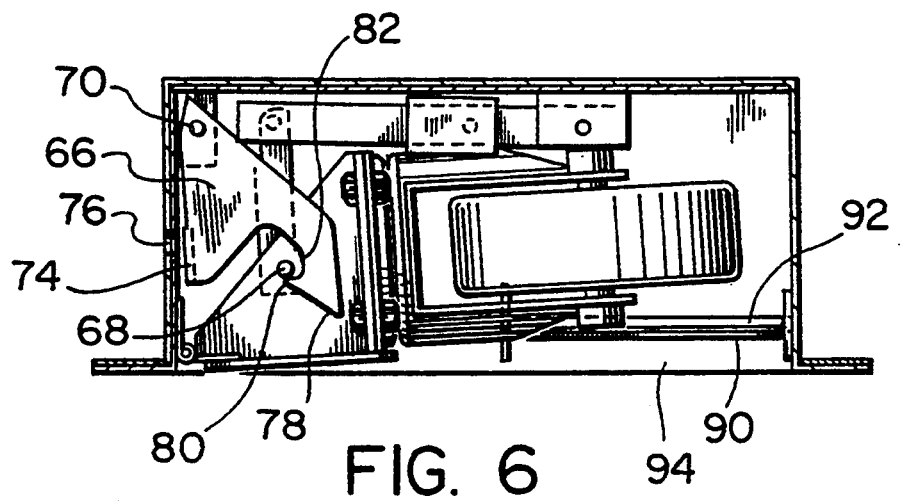
FIG. 6

RETRACTABLE CASTER ASSEMBLY

BACKGROUND OF THE INVENTION

The present invention relates to an improved retractable caster assembly.

In my earlier U.S. Pat. No. 4,845,804 issued Jul. 11, 1989, a retractable caster for difficult-to-manage cases, crates and the like was described. That caster assembly is designed to be either surface mounted or flush mounted on the bottom of large and bulky or heavy containers or cases, to facilitate their handling. Thus, when such cases or containers, fitted with such retractable caster assemblies, are placed in conditions where they would be subjected to irregular or sudden motion, the wheels are retracted. On the other hand, when it is desired to move such containers or cases, the wheels may be withdrawn into operative position so that the containers could be moved by rolling on the caster wheels.

The caster construction described and illustrated in that patent comprises a frame having a planar base and sides circumscribing the base to form a cavity having an opening. The frame is secured at an appropriate location on the bottom of the container, case or other object in question. A rigid flap is provided secured to the frame by a hinge, to swing about an axis between open position perpendicular to the base and closed position, parallel to but spaced from the base, to close at least a portion of the cavity opening. A wheel is rotatably supported by a wheel support assembly secured to the flap. A portion of the wheel extends beyond the lower edge of the flap when in operative position. An articulated strut is secured to and extends between a portion of the frame and the wheel support assembly. The strut folds when the wheel is in retracted position so that the wheel, wheel support and strut are fitted within the cavity between the base and the flap in closed position. A pin lock is provided, to pass through apertures in overlapping portions of the strut, to lock the strut in operative position.

While such a caster construction has proven to be remarkably effective in operation, certain improvements have been found to be desirable. More particularly, the strut lock arrangement requires a worker to place his or her hand within the cavity of the assembly frame to remove or insert the pin, with consequent danger of injury, particularly considering the weight of many of the containers to which such assemblies are secured.

A more secure method of locking the strut in its open, operative position, is also been felt to be a desirable goal and is thus an object of the present invention. It is a further object of the present invention to provide a mechanism which will enable the release of that locking mechanism, to enable the strut to be folded and wheel elevated into retracted position, minimizing the need for a worker to place a hand within the assembly frame cavity. It is a further object of the present invention to provide a reliable, effective mechanism for releasably securing the caster wheel in its retracted position, again which mechanism can be operated safely by a worker from outside the assembly frame cavity.

SUMMARY OF THE INVENTION

In accordance with the present invention, there is provided an improvement for a retractable caster of the type comprising:

(a) a frame having a planar base and sides circumscribing the base to form a cavity having an opening, the frame to be secured to the bottom of an objection;

(b) a rigid flap secured to the frame by a hinge to swing about an axis between an operative position perpendicular to the base and a retracted position parallel to but spaced from the base at least a portion of the opening to the cavity;

(c) a wheel rotatably supported by a wheel support assembly secured to the flap, a portion of the wheel extending beyond the lower edge of the flap when in operative position;

(d) an articulated strut secured to and extending between a portion of the frame and the wheel support assembly and comprising a pair of elongated members, the members pivotable with respect to each other in one direction about a pivot axis between a linearly aligned, operative position and a folded, retracted position, the strut folding when the wheel is in retracted position so that the wheel, wheel support means and strut are fitted within the cavity between the base and the flap in retracted position;

(e) a strut lock means associated with the assembly for releasably locking the strut in operable position, the strut when locked in operable position to rigidly support the wheel and flap in open for load bearing purposes; and (f) the wheel support assembly comprising a wheel mount, the wheel being releasably secured to the wheel mount for rotation about an axle secured to the wheel mount and passing through the wheel.

More particularly the improvement is characterized in that the strut lock means comprises a sleeve mounted on the strut for sliding movement thereon, between closed position removed from the pivot axis and not interfering with the folding of the strut, and operative position seated over the pivot axis to hold the strut members in aligned, operative position and prevent their pivoting with respect to each other. Sleeve control means are mechanically associated with the sleeve automatically to move the sleeve to closed position when the wheel is being retracted, and to operative position when the wheel is moved to operative position.

In a preferred embodiment of the present invention, the sleeve control means comprises an elongated finger, a portion of which is pivotally secured to the frame within the cavity and another portion of which is pivotally secured to the sleeve. A bearing surface is associated with the finger, and an aperture is located in a side of the frame aligned with the bearing surface. The bearing surface and aperture is positioned so as to allow a user to insert a rigid probe means through the aperture to bear against the bearing surface and thereby manually move the finger and sleeve away from operative position, with the sleeve off of the pivot axis of the strut members, to enable the strut to be folded to retracted position.

In yet a further preferred embodiment, the caster assembly is provided with a retraction lock means comprising a catch pivotally secured to a wall of the frame within the cavity. The catch is pivotable between a locking position releasably engaging a latch secured to either the flap or the wheel support assembly to hold the wheel, wheel support assembly, strut and flap in retracted position, and a release position clear of the latch to permit the wheel, wheel support assembly strut and flap to move unobstructedly to operative position. The catch is provided with a bearing surface and aperture is located in a wall of the frame, aligned with a portion of the catch, so as to allow a user to insert a rigid probe means through the aperture against the bearing surface and thereby manually move the catch from locking position to release position.

The sleeve lock mechanism for the strut members, in accordance with the present invention, provides a simple yet effective and safe means for locking the strut members in their aligned, operative position, making it virtually impossible for the strut members to collapse into folded position, even under the tremendous weights which the caster mechanism is designed to carry. As will be described in more detail subsequently, the strut lock means and the retraction lock means both can be easily activated by a worker while a case, to which such assemblies are secured, is elevated in the air for instance by a forklift truck. They may be activated from within the cavity or from the outside using the bearing surface/aperture arrangement associated with each means.

BRIEF DESCRIPTION OF THE DRAWINGS

These and other objects and advantages of the invention will become apparent upon reading the following detailed description and upon referring to the drawings in which:

FIGS. 5a and 5b are detailed perspective views of the strut lock in operative, open position (FIG. 5a) and in unlocked position, with the wheel assembly being moved towards retracted position (FIG. 5b); and FIG. 6 is a side view, in partial section, of the assembly in retracted position.

Figure 1:
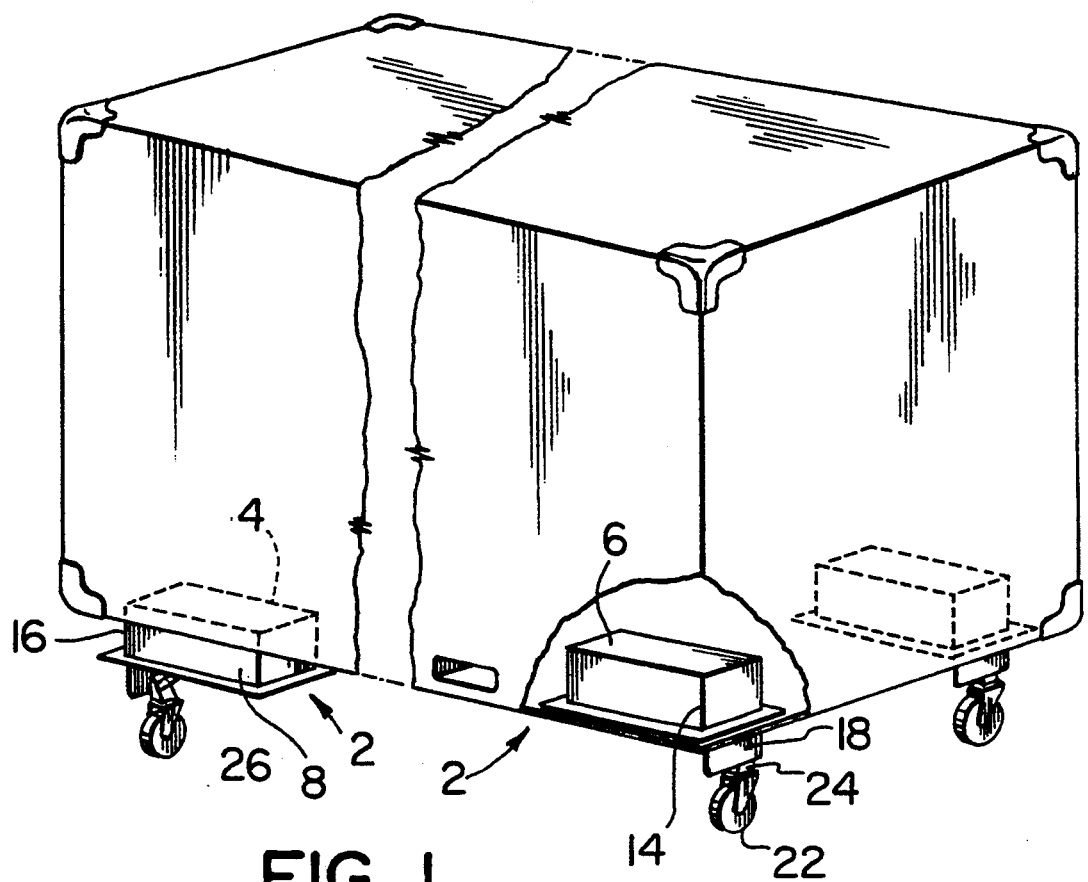
FIG. 1 is a perspective, schematic view of a case illustrating both flush mounting and surface mounting of a caster assembly of the present invention.

While the invention will be described in conjunction with an illustrated embodiment, it will be understood that it is not intended to limit the invention to such an embodiment. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the drawings, similar features have been given similar reference numerals.

Figure 2:
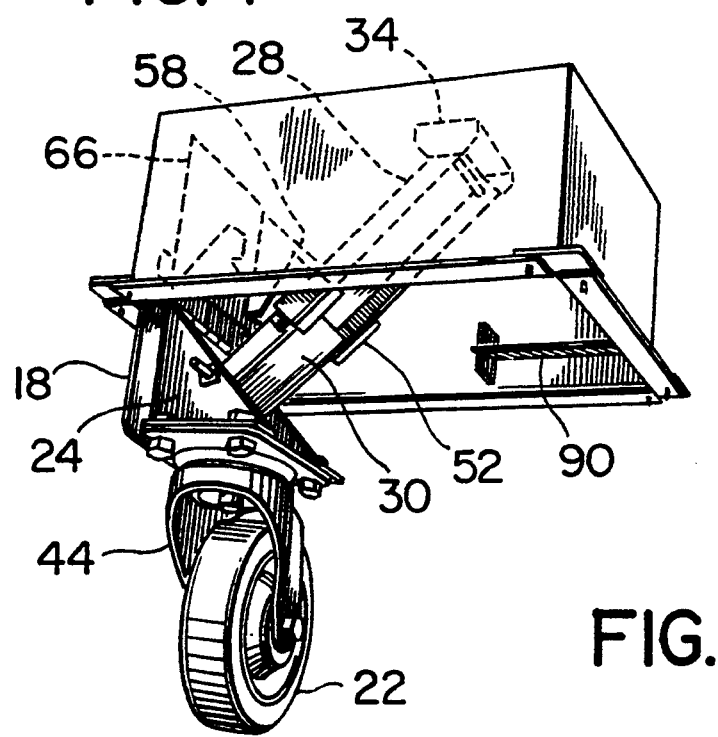
FIG. 2 is a perspective view, from the bottom, of a preferred embodiment of a retractable caster in accordance with the present invention.
Figure 3:
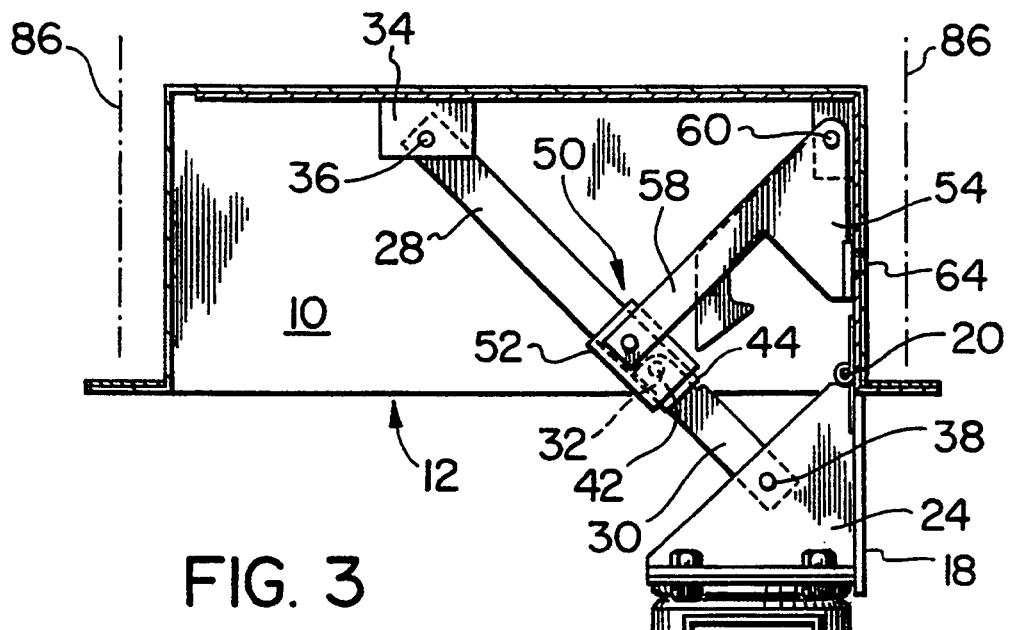
FIG. 3 is a section view along II—II of FIG. 1.
Figure 4:
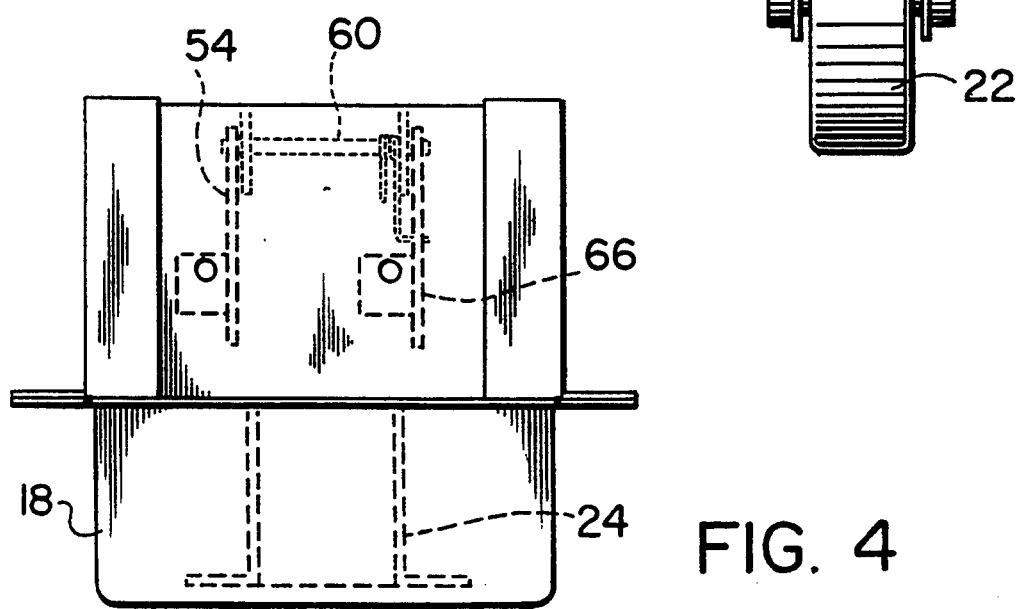
FIG. 4 is a section view along III—III of FIG. 2.

Turning to the drawings, in FIGS. 1 to 6, there is shown a preferred embodiment of a retractable caster assembly 2 in accordance with the present invention. As can be seen in FIGS. 1, 2 and 3, retractable caster assembly 2 comprises a frame 4 having a planar base 6 and sides 8 circumscribing that base to form a cavity having an opening 10. Assembly 2 is intended to be secured to the bottom of an object such as a container or case 12 (FIG. 1) and may be a flush mounted arrangement 14 or a surface mounted arrangement 16, depending upon the desired use.

A rigid flap 18 is secured to frame 4 by an appropriate hinge 20 to swing about an axis which will normally be horizontal during operation, between an open, operative position perpendicular to base 6, (FIGS. 2 and 3) and a closed position (FIG. 6) where it is parallel to but spaced from base 6 to close at least a portion of opening 12 to cavity 10.

A caster wheel is rotatably supported by a wheel support assembly 24 which is secured to an inner surface of flap 18 as illustrated, so as to extend beyond the lower edge of the flap when in open position.

An articulated strut 26, consisting of upper member 28 and lower member 30 pivotally secured to each other by rod 32 which forms a pivot axis, is secured to and extends between an inner portion of base 6, by means of upper strut mount 34, and a portion of wheel support assembly 24. Upper strut member 28 is pivotally secured to upper strut mount 34 by rod 36. Lower strut member 30 is pivotally secured to wheel support assembly 24 by means of rod 38. As can be seen in FIG. 6, strut members 28 and 30 have transverse cross-sectional shapes comprising a wide base with upstanding sides normal thereto, the members being pivotally attached to each other with corresponding ends 40 and 42 respectively, overlapping each other so as to prevent the strut members from pivoting beyond an operative position in which the members are linearly aligned with each other, and permitting the strut members to fold into retracted position (FIG. 6). In that retracted position, as can be seen in FIG. 6, wheel 22, wheel support assembly 24 and strut 26 are all fitted within cavity 10 between base 6 and flap 18, so no part thereof extends below opening 12.

As can be seen in FIGS. 2 and 3, wheel support assembly 24 includes a conventional wheel mount 44 to which the wheel 22 is rotatably secured for rotation about axle 46. Wheel mount 44 may be attached to the rest of wheel support assembly 24 by conventional swivel means 48, so that the wheel pivots about a vertical axis when in operative position, as illustrated in FIG. 3, or may be fixedly secured thereto (not illustrated).

Many of the features of this caster assembly, described up to this point are similar to those of the retractable caster assembly described in my aforementioned U.S. Pat. No. 4,845,804.

In order to prevent upper and lower strut members 28 and 30 from unintentionally pivoting towards retracted position, when in aligned, operative position (e.g. FIGS. 2 and 3), a sliding lock collar mechanism 50, more particularly illustrated in FIGS. 3 and 6, is provided. This mechanism comprises a sleeve 52 which circumscribes and slides on these members of strut 26. In its operative, locking position as illustrated in FIG. 3, sleeve 52 is of sufficient length to cover overlapping ends 40 and 42 of strut members 28 and 30 to prevent them from pivoting out of aligned orientation. A locking hinge 54 is pivotally secured at rod 56, to an inner wall of a side 8 as illustrated, and has a finger 58 which is pivotally secured to sleeve 52 at pivot 60. The location and orientation of locking hinge 54 and finger 58, are such that, in their locking position as illustrated in FIG. 3, they hold sliding lock collar 50 in operative position over strut hinge rod 36, to prevent the pivoting of upper and lower strut members 28 and 30 with respect to each other. But when locking hinge and finger 58 pivot upwardly, about pivot rod 60, that motion draws sliding lock collar 50 upwardly, along upper strut 28. This motion not only causes locking collar 50 to clear the area of overlapping ends 40 and 42 of the strut members and the strut hinge rod 32, to permit the strut members to pivot with respect to each other, it also causes upper strut member 28 to commence a counter-clockwise rotation (as viewed in FIG. 2) about upper strut mount rod 36, thereby breaking the alignment of upper strut member 28 with lower strut member 30 and permitting the further retraction of wheel 22 and wheel support assembly 24 into cavity 10. In other words, this action of locking hinge 54 and finger 58 drawing sliding lock collar 50 up upper strut member 28 breaks the alignment of the strut members. This is necessary before retraction of the wheel 22 and wheel support assembly 24 can take place.

It should be noted that, when wheel 22 and wheel support assembly 24 move from retracted position (FIG. 6) to operative position (FIGS. 2 and 3), that motion is accomplished by simple gravity fall of these components, as well as gravity fall of sliding lock collar 50 on upper strut member 28, back into operative position over overlapping ends 40 and 42 of the strut members and over strut hinge rod 32.

To accomplish the lifting of sliding lock collar onto upper strut member 28, out of operative position, a bearing surface 62 is provided on an exterior portion of locking hinge 54, as illustrated, and an aperture 64, aligned therewith, is provided in a corresponding portion of adjacent side 8. In this manner, when it is desired to cause movement of sliding lock collar 50 out of its operative position, so that the caster wheel 22 can be retracted, a probe such as screwdriver may be inserted through aperture 64, and pressure applied thereby to bearing surface 62, to cause locking hinge 54 to pivot in a clockwise fashion about pivot rod 60. In this way, a worker's fingers can be kept clear of the interior of the cavity when retraction is commenced.

As can be seen in FIG. 6, when wheel 22, wheel support assembly 24 and upper and lower strut members 28 and 30 are in retraced position within cavity 10, they are releasably held there by means of a catch 66 releasably cradling a latch 68 in the form of an extension rigidly secured to a corresponding portion of wheel support assembly 24. Catch 66 is pivotally secured within cavity 10, adjacent corresponding side 8, as illustrated, by means of pivot rod 70. A spring 72 associated with catch 66, pivot rod 70 and adjacent side 8 biases catch 66 to the normal or closed position illustrated, to prevent unwanted release of latch 68 when cradled in catch 66. A bearing surface 74 however is provided on a rear portion of catch 66, and a further aperture 76 aligned with respect thereto is provided in corresponding side 8, adjacent bearing surface 74. In this manner, when it is desired to release latch 68/catch 66 from its cradled position, as illustrated, a probe such as a screwdriver is inserted through aperture 76 and pressed against bearing surface 74 to overcome the bias of spring 72 and cause catch 66 to pivot about rod 70, thereby freeing latch 68 and enabling the wheel 22 and wheel support assembly 24 to fall, by way of gravity, into operative position. In this way, again, a worker need not place his or her fingers within cavity to unlock wheel 22 and wheel support assembly 24 from their retracted position and to cause them to swing to operative position. As previously indicated, this motion, and the pivoting of upper strut member 28 and lower strut member 30 into alignment automatically causes sliding lock collar 50 to fall into operative, locking position over the hinge rod 32. It is a desired feature of the present invention the aperture 64 and 76 both be in the same wall 8, preferably an end wall of frame 4.

When wheel 22 and wheel support assembly 24 are swung about hinge 20, into retracted position within cavity 10 of frame 4, cam surface 78 on the end of catch 66 comes into contact with latch 68, as the wheel and wheel support assembly approach retracted position, causing catch 66 to pivot slightly counterclockwise about pivot rod 70, until latch 68 clears the end 80 of cam surface 78. Catch 66 then swings back to its normal, closed position with latch 78 then cradled within the inner, hook portion of 82 of catch 66.

Since many of the cases, cartons, crates and the like to which the retractable caster assembly 2 of the present invention may be attached will be in part moved by mechanical means such, as for example, forklift trucks, or where the retractable caster assembly might otherwise be subjected to physical abuse, the frame 4, and particularly its sides 8 may be provided with a further, spaced wall 86 (phantom FIG. 3), having access holes 88 aligned with apertures 64 and 76 on frame sides 8.

As previously indicated, both swivel and fixed caster arrangements may be used in the retractable caster assembly of the present invention. As well, depending upon the intended use, the wheel support assembly and wheel may be for example offset to one side of an end wall or side 8 of frame 4 (which frame would normally have rectangular walls and base). With such offset, where swivel casters are used, in order to ensure that the retractable caster assembly 2 is as compact as possible and ensure that wheel 22 is, in retracted position, held entirely within cavity 10, a small flap 90 may be provided as illustrated, along a side 8 partially across opening 10, upon which wheel 22 may be supported when in retracted position. This flap 90 is preferably secured to the interior wall of corresponding side 8 by means of a spring hinge 92 or the like, so that it is usually in a position normal to corresponding side 8 but may be opened downwardly, against the urging of spring hinge 92, if required, to facilitate the positioning of wheel 22 thereon, during retraction. This small flap acts as a caster holding door to prevent the swivel wheels from swinging out of cavity 10 and partially deploying when in retracted position.

Alternatively, instead of flap 90, a spring loaded flap 94 may be provided adjacent flap 18, to close the remaining portion of opening 12 when wheel 22 and wheel support assembly 24 are in retracted position (phantom FIG. 3). The spring bias of flap 94 would be such as to be overcome by the weight of wheel 22 and wheel support assembly 24 as they fell, under gravity into operative position, after release of latch 68 from catch 66.

Thus it is apparent that there has been provided in accordance with the invention a retractable caster assembly that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. In a retractable caster assembly comprising:

(a) a frame having a planar base and sides circumscribing the base to form a cavity having an opening, the frame to be secured to the bottom of an object;

(b) a rigid flap secured to the frame by a hinge to swing about an axis between an operative position perpendicular to the base and a retracted position parallel to but spaced from the base and covering at least a portion of the opening to the cavity;

(c) a wheel rotatably supported by a wheel support assembly secured to the flap, a portion of the wheel extending beyond the lower edge of the flap when in operative position;

(d) an articulated strut secured to and extending between a portion of the frame and the wheel support assembly and comprising a pair of elongated members, the members pivotable with respect to each other in one direction about a pivot axis between a linearly aligned, operative position and a folded, retracted position, the strut folding when the wheel is in retracted position so that the wheel, wheel support means and strut are fitted within the cavity between the base and the flap in retracted position;

(e) a strut lock means associated with the assembly for releasably locking the strut in operative position, the strut when locked in operative position to rigidly support the wheel and flap for load bearing purposes; and (f) the wheel support assembly comprising a wheel mount, the wheel being releasably secured to the wheel mount for rotation about an axle secured to the wheel mount and passing through the wheel;

the improvement characterized in that the strut lock means comprises a sleeve mounted on the strut for sliding movement thereon, between closed position removed from the pivot axis and not interfering with the folding of the strut, and operative position seated over the pivot axis to hold the strut members in aligned, operative position and prevent their pivoting with respect to each other; and sleeve control means mechanically associated with the sleeve automatically to move the sleeve to closed position once retraction of the wheel has been commenced and to operative position when the wheel is moved to operative position, the sleeve control means comprising an elongated finger, a portion of which is pivotally secured to the frame within the cavity and another portion of which is pivotally secured to the sleeve.

2. An assembly according to claim 1 wherein a bearing surface is associated with the sleeve control means, and an aperture is located in a side of the frame aligned with the bearing surface, the bearing surface and aperture positioned so as to allow a user to insert a rigid probe means through the aperture to bear against the bearing surface and thereby manually move the finger and sleeve away from operative position, with the sleeve off of the pivot axis of the strut members, to enable the strut to be folded to retracted position.

3. An assembly according to claim 2 wherein the strut is oriented so that the sleeve falls into operative position by gravity when the wheel is moved from retracted to operative position.

4. An assembly according to claim 3 wherein the elongated finger, strut and sleeve are positioned and mechanically associated with each other so that the movement of the sleeve away from operative position off of the pivot axis of the strut members automatically also draws the strut members out of aligned position to facilitate their folding.

5. An assembly according to claim 4 wherein the strut members each have a transverse cross-sectional shape comprising a wide base with upstanding sides normal thereto, and corresponding ends of the members overlap when in operational position.

6. An assembly according to claim 5 further comprising retraction lock means comprising a catch pivotally secured to a wall of the frame within the cavity and pivotable between an operative position releasably engaging a catch secured to one of the flap or the wheel support assembly to hold the wheel, wheel support assembly, strut and flap in retracted position, and a release position clear of the latch to permit the wheel, wheel support assembly, strut and flap to move unobstructedly to operative position.

7. An assembly according to claim 6 wherein the catch is provided with a bearing surface and wherein an aperture is located in a wall of the frame aligned with a portion of the catch so as to allow a user to insert a rigid probe means through the aperture against the bearing surface and thereby manually move the catch from operative position to release position.

8. An assembly according to claim 1 wherein the strut members each have a transverse cross-sectional shape comprising a wide base with upstanding sides normal thereto, and corresponding ends of the members overlap when in operational position.

9. An assembly according to claim 1 further comprising retraction lock means comprising a catch pivotally secured to a wall of the frame within the cavity and pivotable between an operative position releasably engaging a catch secured to one of the flap or the wheel support assembly to hold the wheel, wheel support assembly, strut and flap in retracted position, and a release position clear of the latch to permit the wheel, wheel support assembly, strut and flap to move unobstructedly to operative position.

10. An assembly according to claim 8 wherein the catch is provided with a bearing surface and wherein an aperture is located in a wall of the frame aligned with a portion of the catch so as to allow a user to insert a rigid probe means through the aperture against the bearing surface and thereby manually move the catch from operative position to release position.

11. An assembly according to claim 10 wherein biasing means are associated with the catch to urge the catch to operative position, the biasing means such as to be overcome by the force of the probe means bearing against the bearing surface.

12. An assembly according to claim 11 wherein the catch comprises a hook and the latch comprises an extension secured to the wheel support assembly, the hook and extension positioned so that the hook receives the extension when the wheel support assembly is in retracted position.

13. An assembly according to claim 12 wherein the biasing means comprises spring means.

14. An assembly according to claim 1 wherein the frame walls are encased with reinforcing walls to strengthen the assembly against damage from the outside.

15. An assembly according to claim 1 further comprising a swivel means between the wheel mount and the wheel support assembly to permit the wheel to pivot about a vertical axis when in operative position.

16. An assembly according to claim 1 further comprising a flap means secured within the cavity and pivotable therewith, positioned to support thereon the wheel when in retracted position.

17. An assembly according to claim 16 wherein the wheel support flap is provided with a biasing means against which the flap may be opened.

* * * * *